United States Patent Office 3,105,013
Patented Sept. 24, 1963

3,105,013
FLUORIDE DENTIFRICES CONTAINING CALCINED ALUMINUM SILICATE ABRASIVES
Everett L. Saul, Woodhaven, N.Y., and Anthony J. Fiscella, Redbank, N.J., assignors to Bristol-Myers Company, New York, N.Y., a corporation of Delaware
No Drawing. Filed Sept. 14, 1961, Ser. No. 138,005
9 Claims. (Cl. 167—93)

This invention relates to dentifrices containing fluorides, and more particularly to such dentifrices which also contain, in addition to a fluoride, a polishing agent which does not interfere with or render unavailable the fluoride.

The use of dentifrices containing fluorine in the form of available water-soluble fluorides has been suggested as a means of reducing the incidence of dental caries. Several dentifrices have been made available commercially with this purpose in mind. Dentifrices containing fluorides have shown a tendency for the fluoride to be inactivated and rendered unavailable by the other ingredients of the dentifrice, especially the polishing agents. Thus when certain calcium-containing polishing agents are employed with the fluoride, calcium fluoride tends to form and is extremely water insoluble, being in fact less soluble than tooth enamel. As highly insoluble calcium fluoride, the fluoride ion is not available and cannot perform its intended role in the mouth of the user.

The most widely used abrasives or polishing agents for dentifrices have been the relatively insoluble calcium salts. For the past decade, dicalcium phosphate has been used as the sole or principal polishing agent in the majority of commercial dentifrices. Other calcium salts which have been or still are being used as part or all of the abrasive system are calcium carbonate, calcium sulfate, dicalcium phosphate, tricalcium phosphate and calcium pyrophosphate. All of these calcium salts, with the exception of calcium pyrophosphate, are incompatible with water-soluble fluorides due to the formation of water-insoluble fluorides or complexes. Calcium pyrophosphate permits initially greater but not complete availability of fluorides because of its lower solubility, but tends to form insoluble fluorides upon aging. Because of their tendency to insolubilize the fluoride ion those polishing agents or abrasives containing these calcium salts cannot be used in a dentifrice containing a soluble fluoride.

Efforts have been directed to discover polishing agents which are compatible with a soluble fluoride in a dentifrice. One such effort has resulted in the use of calcium pyrophosphate, but this is subject to the tendency to insolubilize the fluoride ion upon aging of the dentifrice. Others which have been considered are microcrystalline hydrated alumina and magnesium hydroxide and insoluble sodium metaphosphate. Neither hydrated alumina nor magnesium hydroxide are completely suitable abrasives for effective fluoride-containing toothpastes. For dentifrices containing a fluoride, a low pH, such as about 3 to 7, but preferably 4.5 to 6, is necessary for maximum fluoride uptake by dental enamel. A high pH (greater than about 9.0) is characteristic of a dentifrice containing substantial amounts of either microcrystalline hydrated alumina and magnesium hydroxide. Any attempt to reduce the pH of the systems containing these materials results in eventual neutralization of the acid used and reversion to the original pH of the abrasives. Insoluble sodium metaphosphate has the characteristic of sequestering or solubilizing calcium which is present in dental enamel and it is therefore inadvisable to use the material as the sole polishing agent in a dentifrice.

It is accordingly an object of this invention to provide a polishing agent which is compatible with soluble fluorides in dentifrices.

It is a further object of this invention to provide an improved dentifrice containing a polishing agent or abrasive which is compatible with a water-soluble fluoride present in the dentifrice.

It is yet another object of this invention to provide a dentifrice from which the full fluoride content is readily extractable from the dentifrice with water.

Other objects will be apparent to those skilled in the art from reading the description which follows.

The objects of this invention were achieved by compounding a fluoride-containing dentifrice with calcined anhydrous aluminum silicate as the principal polishing agent. Calcined aluminum silicate has been found to be fully compatible with a water-soluble fluoride in a dentifrice. This is demonstrated by the fact that the fluoride ion is not insolubilized. Also, the pH of the dentifrice is easily maintained in the desired range of 4.5 to 6 upon aging.

One desirable source of calcined anhydrous aluminum silicate is that sold under the trade name Kaopolite-SF. Kaopolite-SF is produced by calcining washed hydrous aluminum silicate which has an original hardness of 1 to 2 on the Moh scale to provide a calcined plate structure having a hardness of about 7 on the Moh scale. The Kaopolite-SF particles are predominantly single-plate structures about 0.1 micron and all less than 5 microns thick. The surfaces of the constituent plates have crystal protrusions which can be readily seen with an electron microscope at 45,000 magnifications. The specific gravity of Kaopolite-SF at 77° F. is 2.63. The pH of an aqueous suspension of 20% solids is 5.5 to 6.5. A typical analysis of particle size is:

100% less than 5 microns
40% less than 2 microns
30% less than 1 micron

The crystal protrusions are extremely hard having the same hardness as a crystal of pure silica, being about 7 on the Moh's scale. In spite of the hardness of the particles, calcined aluminum silicate does not leave visible scratches on surface of the teeth due to the small size and the flat configuration of the particles. The high abrasive index of calcined aluminum silicate may be reduced where desired by use of water-soluble or water-insoluble solid diluents or "fillers" with the calcined aluminum silicate. For instance, lactose or Gaolin (hydrated aluminum silicate) may be blended as a filler in an abrasive mixture in an amount of up to about 90% by weight of its mixture with the calcined aluminum silicate to obtain a predetermined abrasive index. Thus any abrasive index desired may be obtained. For most purposes it is not necessary or desirable to add more than 50% by weight of filler based on the mixture of filler and calcined aluminum silicate.

The calcined aluminum silicate does not react with fluorides and does not precipitate water-soluble fluorides, such as the alkali-metal fluorides, including sodium, potassium and ammonium fluorides, or stannous fluoride. When calcined aluminum silicate is used as the sole polishing agent in a dentifrice, containing a water-soluble fluoride, it is possible to extract the full fluoride content from the dentifrice with water, even after aging the dentifrice. This demonstrates the availability and freedom from insolubilization of the fluoride. Thus, unexpectedly, calcined aluminum silicate when used in a fluoride-containing dentifrice provides the two features of complete extractability of the fluoride content by water, and, more importantly, the compatibility of the calcined aluminum silicate with soluble fluoride compounds even after long shelf life of the dentifrice compositions.

A series of tests were run consisting of the substitution of different abrasives in a dentifrice containing 0.22% sodium fluoride and the analysis of pH and available fluoride after 24 hours, and one month after preparation. The results are contained in Table I below:

TABLE I

| Abrasive | Initial, percent sodium fluoride | After 24 hours | | 1 month | |
|---|---|---|---|---|---|
| | | pH | Percent sodium fluoride | pH | Percent sodium fluoride |
| Calcined aluminum silicate (Kaopolite-SF) | 0.22 | 4.5 | 0.20 | 4.7 | 0.21 |
| Microcrystalline hydrated alumina | 0.22 | 5.1 | 0.17 | 7.2 | 0.17 |
| Calcium pyrophosphate | 0.22 | 4.5 | 0.14 | 4.6 | 0.11 |

Table I demonstrates the compatibility of calcined aluminum silicate in fluoride-containing dentifrices. As is seen from the table, the pH of the calcined aluminum silicate abrasive dentifrice rose insignificantly over one month while the available fluoride remained essentially constant, within analytical accuracy. On the other hand, the microcrystalline hydrated alumina dentifrice gave quite unsatisfactory indications. With microcrystalline hydrated alumina, the sodium fluoride content dropped markedly within 24 hours and while the available fluoride remained constant after 24 hours, the pH increased markedly indicating that dentifrices containing microcrystalline hydrated alumina as a polishing agent would not be as effective in fluoride uptake in tooth enamel. The optimum fluoride uptake in tooth enamel occurs in the lower pH ranges. Similarly, the calcium pyrophosphate gave indications of being unsatisfactory, for while its pH remained constant the available fluoride decreased markedly within 24 hours and by 20% from 24 hours to 1 month.

Desirably, the pH of the dentifrice of the invention shall be from about 3 to 7, preferably 4.5 to 6, in view of the presence of fluoride ion.

In addition to the water-soluble fluoride and calcined aluminum silicate polishing agent, the dentifrice can contain as optional ingredients a soap or synthetic detergent as a surface tension depressant. Soaps of high molecular weight fatty acids, including, for example, sodium and potassium soaps of myristic, stearic and palmitic acids and the fatty acid mixtures of palm oil and coconut oil, as well as diglycol laurate, diglycol stearate and glycostearine, can be employed. Typical synthetic detergents include the alkyl sulfates and sulfonates having alkyl groups of from about 8 to about 18 carbon atoms, such as sodium lauryl sulfate, the sulfated fatty alcohols derived from coconut oil and palm oil, sodium cetyl sulfate, sulfated sperm oil fatty alcohols and sodium oleyl sulfate, salts of fatty acid amides of taurines (the Igepons), such as sodium palmitic methyl tauride, sulfated glycerides, such as oleyl, stearic, palmitic and ricinoleic glycerides, usually in the form of mixed glycerides and sulfonated hydrocarbons having from 8 to 20 carbon atoms, such as sulfonated decanes, dodecanes and octadecanes. Particularly good results are obtained with Tweens, such as Tween 20 which is the polyoxyethylene derivative of sorbitan monolaurate. Another type is the Drucals, such as sodium lauroyl isethionate.

Other optional conventional components of a dentifrice which may be present include flavoring materials, such as the flavoring oils (peppermint oil, etc.); sweeteners, such as saccharin and sodium cyclamate, and harmless coloring materials, in proportions to give any desired taste or flavor or other effect. Stabilizing agents such as citrates and tartrates may be present as disclosed in the copending application of one of us, Anthony J. Fiscella, Ser. No. 136,441, filed September 7, 1961.

In a preferred embodiment of the invention, the dentifrice is in the form of a paste, and in this event it will contain a carrier and softener and a binder in amounts to give the dentifrice a smooth texture and good flowability. Glycerin, propylene glycol and sorbitol are preferred humectants, carriers and softeners, but other softeners known to those skilled in the art can also be employed. As binders there can be used carboxymethylcellulose, gum tragacanth, sodium alginate, Irish moss, gum acacia, pectin, etc. Those skilled in the dentifrice art will know other carriers, softeners and binders. The pastes may be either of the aqueous type containing substantial amounts of water (above 18%), or of the substantially anhydrous type, containing less than 5% water. Formulations are given below for both types.

In addition to pastes the dentifrices of the invention may be in the form of powders. The main difference between a paste and powder is that the latter contains little or no water and usually no binder or softener.

The following are general formulations of tooth pastes and powders of the type contemplated according to the present invention (parts are expressed in terms of parts by weight):

AQUEOUS TOOTH PASTE

| | Parts by weight |
|---|---|
| Water-soluble fluoride salt | 0.10 to 2.0 |
| Water | 18 to 25 |
| Binder | 0.8 to 1.2 |
| Polishing agent or abrasive | 5 to 50 |
| Filler | 0 to 45 |
| Softener or humectant | 20 to 25 |
| Detergent | 0 to 2 |
| Sweetener | 0.1 to 0.2 |
| Flavoring oils | 0.9 to 1.2 |

SUBSTANTIALLY ANHYDROUS TOOTH PASTE

| | Parts by weight |
|---|---|
| Water-soluble fluoride salt | 0.10 to 2.0 |
| Water | 0 to 4.5 |
| Binder | 0.3 to 1.2 |
| Polishing agent or abrasive | 5 to 70 |
| Filler | 0 to 45 |
| Humectant | 25 to 45 |
| Detergent | 0 to 2 |
| Sweetener | 0.03 to 0.10 |
| Flavoring oils | 0.9 to 1.2 |

POWDER

| | Parts by weight |
|---|---|
| Water-soluble fluoride salt | 0.10 to 2.0 |
| Polishing agent or abrasive | 10 to 98 |
| Filler | 0 to 90 |
| Detergent | 1 to 3 |
| Flavoring oils | 0.85 to 1.2 |
| Sweetener | 0.1 to 0.2 |

In order more clearly to disclose the nature of the present invention, specific examples illustrating the preparation of typical dentifrices will hereinafter be described. It should be understood, however, that this is done solely by way of example and is intended neither to delineate the scope of the invention nor limit the ambit of the appended claims. Unless otherwise stated, quantities of materials are referred to in terms of parts by weight. The materials are mixed together in accordance with the standard practices in the dentifrice art.

*Example 1*

The following is an example of a tooth paste utilizing Kaopolite-SF and stannous fluoride.

Ingredient:
| | |
|---|---|
| Deionized water | 21.70 |
| Saccharin (soluble) | 0.10 |
| Sodium citrate | 2.00 |
| Ascorbic acid | 0.50 |
| Flavor | 0.85 |
| Sorbitol (70% aqueous solution) | 26.00 |
| Veegum F (magnesium aluminum silicate) | 1.20 |
| Glycerin | 10.00 |
| Kelcoloid LV (alginic acid ester of propyleneglycol) | 0.75 |
| Kaopolite-SF (calcined aluminum silicate) | 35.00 |
| Sodium lauryl sulfate | 1.50 |
| Stannous fluoride | 0.40 |
| | 100.00 |

*Example II*

The following is an example of another tooth paste formulation utilizing calcined aluminum silicate and stannous fluoride.

Ingredient:
| | |
|---|---|
| Deionized water | 16.75 |
| Soluble saccharin | 0.10 |
| Sodium citrate | 2.00 |
| Ascorbic acid | 0.50 |
| Flavor | 0.85 |
| Sorbitol (70% aqueous solution) | 25.95 |
| Veegum F (magnesium aluminum silicate) | 1.20 |
| Glycerin | 10.00 |
| Kelcoloid LV (alginic acid ester of propyleneglycol) | 0.75 |
| Kaopolite-SF (calcined aluminum silicate) | 40.00 |
| Sodium lauryl sulfate | 1.50 |
| Stannous fluoride | 0.40 |
| | 100.00 |

*Example III*

The following is an example of a tooth paste formulation utilizing calcined aluminum silicate and having lactose as a diluent abrasive and using sodium fluoride as the fluoride.

Ingredient:
| | |
|---|---|
| Deionized water | 15.20 |
| Soluble saccharin | 0.10 |
| Ascorbic acid | 0.50 |
| Sodium citrate | 2.00 |
| Flavor | 0.85 |
| Sorbitol | 20.00 |
| Veegum F (magnesium aluminum silicate) | 1.00 |
| Lactose | 20.00 |
| Glycerin | 7.5 |
| Kelcoloid LV | 0.75 |
| Kaopolite-SF | 30.00 |
| Sodium lauryl sulfate | 1.70 |
| Sodium fluoride | 0.40 |
| | 100.00 |

*Example IV*

The following is an example of a tooth powder formulation utilizing calcined aluminum silicate and having as a diluent abrasive or filler a mixture of lactose and hydrated aluminum silicate.

Ingredient:
| | |
|---|---|
| Saccharin | 0.2 |
| Flavor | 1.1 |
| Sodium lauryl sulfate | 2.0 |
| Sodium fluoride | 0.22 |
| Kaopolite | 20 |
| Gaolin (hydrated aluminum silicate) | 30 |
| Lactose | 46.48 |
| | 100.00 |

The terms and expressions employed are used as terms of description and not of limitation and it is not intended in the use of such terms and expressions to exclude any equivalents of the features shown and described or portions thereof, but it is recognized that various modifications are possible within the scope of the claimed invention.

What is claimed is:

1. A dentifrice comprising a dentifrice vehicle, a water-soluble fluoride and calcined aluminum silicate abrasive.

2. A dentifrice as defined by claim 1 having a pH between about 3 and about 7.

3. A dentifrice as defined by claim 1 wherein the water-soluble fluoride is stannous fluoride.

4. A dentifrice as defined by claim 1 wherein the water-soluble fluoride is sodium fluoride.

5. A dentifrice comprising a dentifrice vehicle, up to about 2% by weight of a water-soluble fluoride and as an abrasive, calcined aluminum silicate.

6. A dentifrice comprising a dentifrice vehicle, up to 2% by weight of a water-soluble fluoride, and between about 35% by weight and 98% by weight of an abrasive, said abrasive being comprised of at least about 10% by weight of calcined aluminum silicate.

7. A dentifrice as in claim 6 wherein said abrasive mixture is composed of about 60% by weight calcined aluminum silicate and about 40% lactose.

8. A toothpaste comprising a toothpaste vehicle, from about 0.1% to about 2.0% by weight of a water-soluble fluoride and from about 35% to about 70% of an abrasive mixture composed of at least 50% calcined aluminum silicate.

9. A tooth powder comprising a tooth powder vehicle, up to about 2% by weight of a water-soluble fluoride and from about 5% to about 98% calcined aluminum silicate.

References Cited in the file of this patent

UNITED STATES PATENTS

| 2,130,034 | Schmidt | Sept. 13, 1938 |
| 2,742,345 | Kloepfer et al. | Apr. 17, 1956 |
| 2,876,168 | Broge et al. | Mar. 3, 1959 |

FOREIGN PATENTS

| 845,611 | Great Britain | Aug. 24, 1960 |